United States Patent [19]

Eckert

[11] 4,352,843

[45] Oct. 5, 1982

[54] COMPONENT FOR A MULTIPLANAR DEVICE

[75] Inventor: Ronald P. Eckert, Northbrook, Ill.

[73] Assignee: Thomas A. Schutz Co., Inc., Morton Grove, Ill.

[21] Appl. No.: 180,097

[22] Filed: Aug. 21, 1980

[51] Int. Cl.³ .............................................. B32B 3/00
[52] U.S. Cl. ...................................... 428/33; 156/258; 156/266; 156/304.1; 156/304.5; 428/38; 428/44; 428/46; 428/53; 428/54; 428/57; 428/58; 428/60; 428/81
[58] Field of Search ...................... 428/33, 38, 44, 46, 428/47, 52, 57, 58, 60, 81, 45, 53, 54, 55, 56, 77; 156/211, 258, 266, 304.1, 304.5; 264/31, 32, 132, 241, 248, 249

[56] References Cited

U.S. PATENT DOCUMENTS

| | | | |
|---|---|---|---|
| 2,683,679 | 7/1954 | Hurd et al. | 156/211 |
| 3,122,598 | 2/1964 | Berger | 264/247 |
| 3,382,134 | 5/1968 | Powell | 161/5 |
| 3,518,146 | 6/1970 | Plympton | 156/245 |
| 3,654,053 | 4/1972 | Toetter | 428/56 |
| 3,679,531 | 7/1972 | Wienand et al. | 428/33 |
| 4,009,309 | 2/1977 | Holt | 428/38 |
| 4,016,235 | 4/1977 | Ferro | 264/132 |
| 4,110,393 | 8/1978 | Trame | 264/132 |

FOREIGN PATENT DOCUMENTS 79140 9/1962 France .

*Primary Examiner*—Caleb Weston
*Attorney, Agent, or Firm*—Wegner, McCord, Wood & Dalton

[57] ABSTRACT

A multiplanar device has at least one component that consists of two rigid plastic wall members that have major areas of substantially uniform thickness, strips of considerably greater thickness along the side portions of said wall members, and a miter joint between the two wall members. A continuous thin film of flexible plastic is bonded to the two wall members and around the outside of the miter joint.

The method of making the component is to mold it as a flat intermediate piece with a V-notch between the strips of greater thickness and to simultaneously bond the film to the surface at the apex of the V; and to thereafter apply adhesive to the sides of the V and bend the piece to bring the sides of the notch together and bond them together.

Several such components may be connected with other similar or dissimilar components at miter joints to form a complete multiplanar device.

4 Claims, 15 Drawing Figures

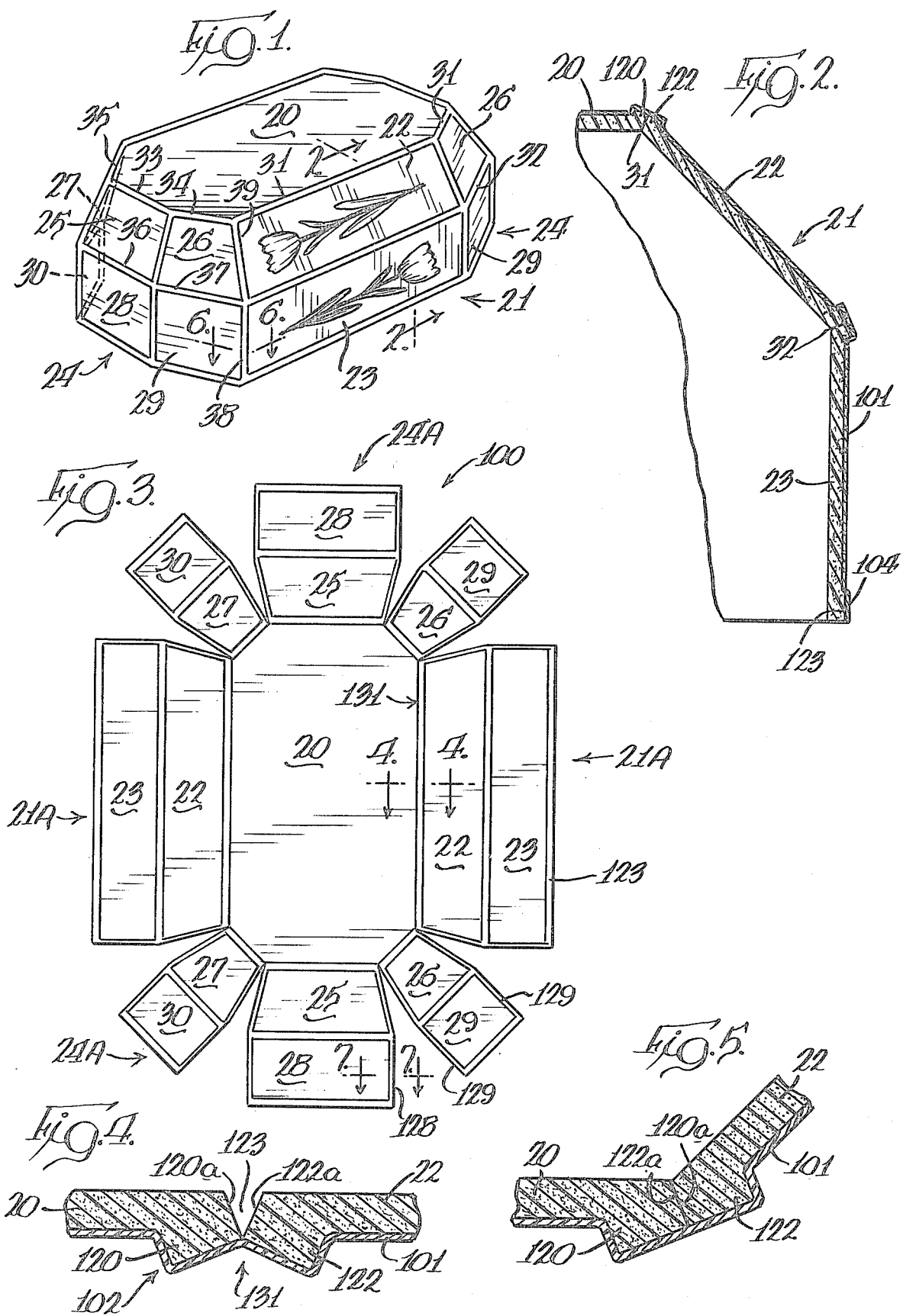

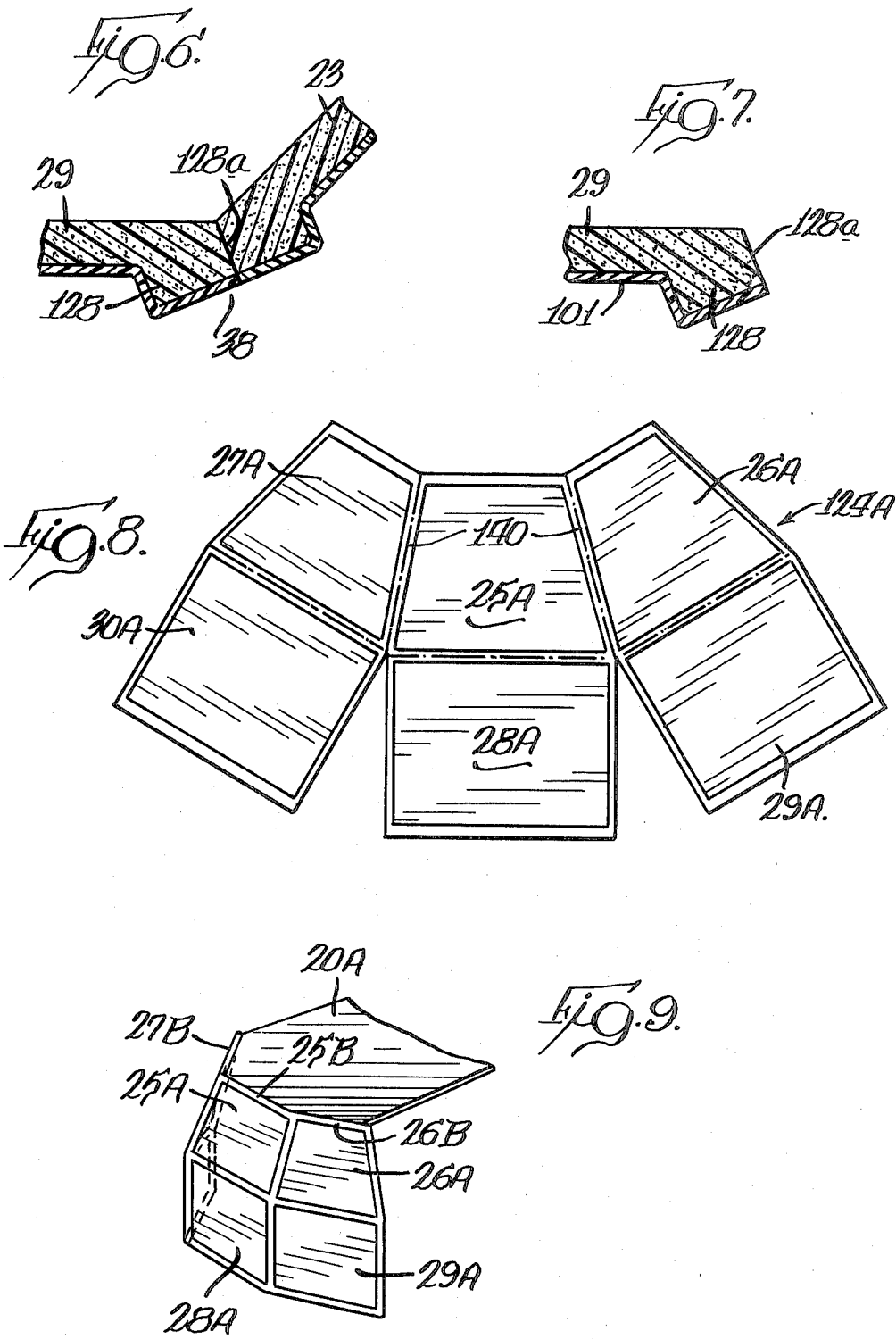

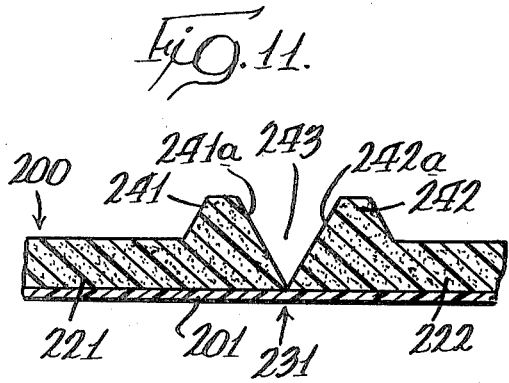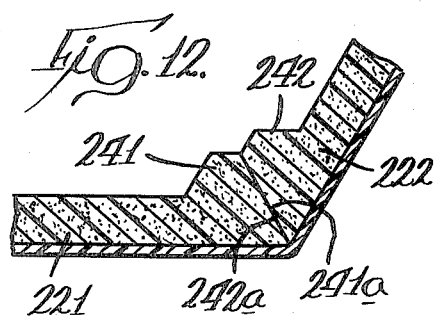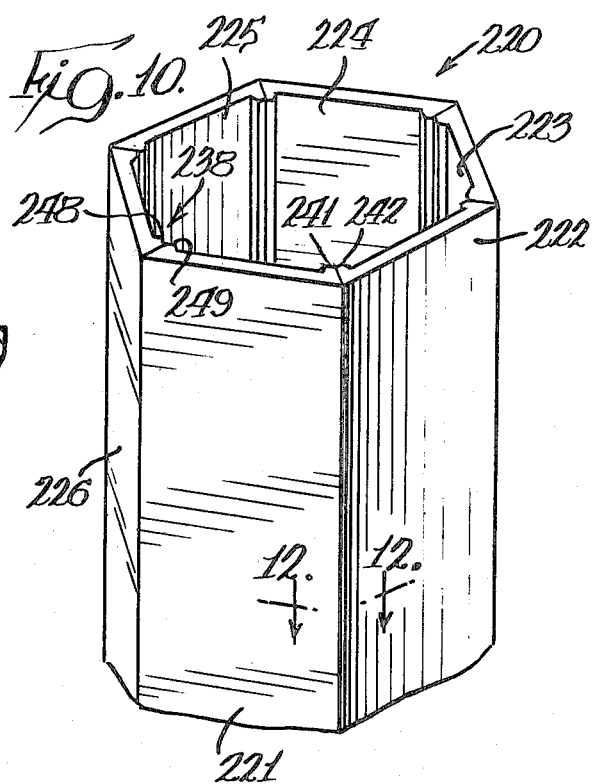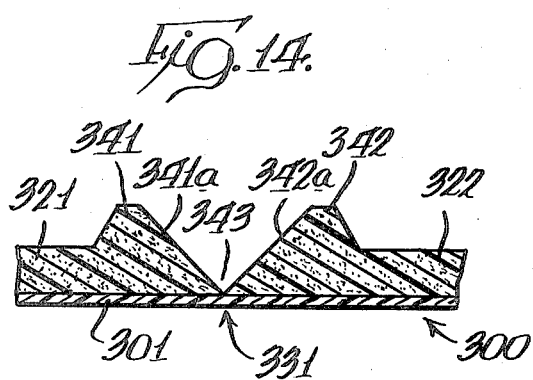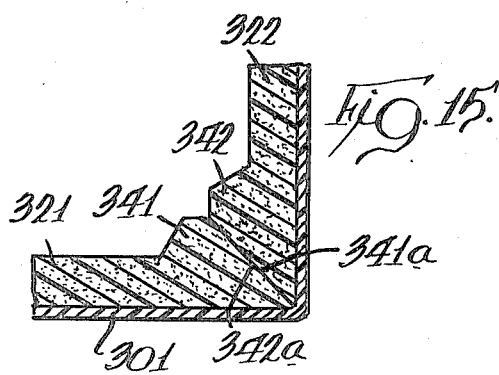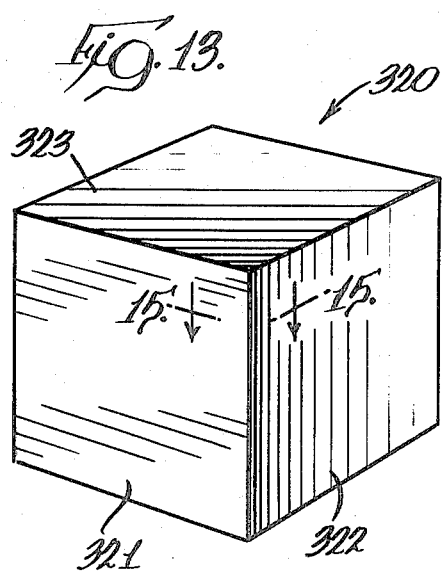

COMPONENT FOR A MULTIPLANAR DEVICE

BACKGROUND OF THE INVENTION

A vast amount of work has been done upon making decorative, multiplanar articles by plastic molding; and in addition a good deal of work has been done upon techniques for producing plastic moldings in the form of simulated, leaded stained glass. Patents in these fields which are known to applicant include the following:

U.S. Pat. No. 4,110,393, for making plastic simulations of such articles as Tiffany-type lamp shades.

U.S. Pat. No. 4,016,235, for making simulated stained glass.

U.S. Pat. No. 4,009,309 for making three-dimensional plastic articles having a stained glass effect.

U.S. Pat. No. 3,518,146 for making ornamental objects with simulated inlaid designs.

U.S. Pat. No. 3,382,134, for producing simulated, leaded Venetian glass.

U.S. Pat. No. 3,122,598 for producing plastic articles such as dinnerware provided with a decorative surface insert.

SUMMARY OF THE INVENTION

The present invention relates to the manufacture of decorative, multiplanar articles from plastic. Such articles may be, for example, multiplanar lamp shades, or hexagonal or octagonal containers, or multiplanar closed shapes such as a pyramid, a frustum of a pyramid, a cube, or a solid having more than six surfaces.

In accordance with the present invention a multiplanar device has at least one component that comprises first and second polygonal wall members of substantially rigid molded plastic which have major areas of substantially uniform thickness, with the wall members having strips along their adjacent side portions which are substantially thicker than the major areas, and with the adjacent sides of the wall members forming a miter joint which positions the wall members at a predetermined angle to one another. The panels are bonded together at the miter joint, and a thin film of flexible plastic is bonded to substantially the entirety of the wall members and forms a connection between the wall members around the outside of the miter joint.

In order that a component as above described may be joined with other similar or dissimilar components to form a complete, multiplanar device, each of the first and second wall members has a strip along each side portion which is substantially thicker than the major areas of the wall members, and each side of each wall member is a miter constructed and arranged to permit a plurality of components, all having thickened strips along each side and with the sides being miters, to be bonded to one another along the miters to form the multiplanar device.

In a component for a device such as a cube, each thicker strip is defined by an inwardly projecting rib; while for something like a simulated leaded glass article, each thicker strip is defined by an outwardly projecting rib which simulates the appearance of the leading between panes of glass.

The method of making a component as above described is to mold the rigid walls in a single plane with a V-notch between the strips of greater thickness and with the thin film bonded to the walls across the apex of the V-notch in a single step. Thereafter adhesive is applied to the sides of the V-notch and the intermediate piece is bent along the V-notch to bring the surfaces of the notch into contact and adhere them to one another, so as to form the component having two walls connected by a miter joint.

The surface of the film is provided with any desired decorative material before it is bonded to the walls.

In the case of an article which has the thicker strips defined by outwardly projecting ribs, the thin film of flexible plastic material is vacuum formed to provide it with a recess which defines the narrow strips of greater thickness, and the vacuum formed film is placed in a mold one face of which has a groove such that the mold face completely supports the thin film including the recess. The simultaneous molding and bonding is carried out in said mold with the flexible film in the mold.

In the latter type of operation, the decorative material must be applied to the surface of the film before it is vacuum formed, and the shape of the material as applied is so distorted from the desired final shape that it assumes said final shape during vacuum forming.

The present method greatly simplifies and cheapens the manufacture of multiplanar devices by permitting the components to be produced entirely in planar molds, after which the adjacent walls are bent, or folded to a desired angular relationship in a simple fixture which holds them until the connecting adhesive is set.

The rigid wall material may conveniently be polystyrene; while the thin film must be sufficiently flexible to be capable of vacuum preforming and bending at the miter joint. A vinyl or polyester film about 0.0015 or 0.002 inch thick is satisfactory.

THE DRAWINGS

FIG. 1 is a perspective view of a multiplanar lamp shade of a type that may be made from components of the present invention;

FIG. 2 is a fragmentary sectional view on an enlarged scale taken substantially as indicated along the line 2—2 of FIG. 1;

FIG. 3 is one type of intermediate piece that may be used to make the entire multiplanar device of FIG. 1;

FIG. 4 is a fragmentary sectional view on an enlarged scale taken substantially as indicated along the line 4—4 of FIG. 3;

FIG. 5 is a view like FIG. 4 after the miter joint has been formed;

FIG. 6 is a fragmentary sectional view on an enlarged scale taken substantially as indicated along the line 6—6 of FIG. 1;

FIG. 7 is a fragmentary sectional view on an enlarged scale taken substantially as indicated along the line 7—7 of FIG. 3;

FIG. 8 is a plan view on an enlarged scale of an alternative type of intermediate piece that may be used for the end of a device such as that of FIG. 1;

FIG. 9 is a perspective view of a component produced from the intermediate piece of FIG. 8;

FIG. 10 is a fragmentary perspective view of a hexagonal device which may be used as a container, or a decorative pillar or the like;

FIG. 11 is a fragmentary sectional view on an enlarged scale illustrating the adjacent parts of two walls of an intermediate piece used in fabricating the structure of FIG. 10;

FIG. 12 is a fragmentary sectional view on an enlarged scale taken substantially as indicated along the line 12—12 of FIG. 10;

FIG. 13 is a perspective view of a cube which may be fabricated in accordance with the present invention;

FIG. 14 is a fragmentary sectional view on an enlarged scale illustrating adjacent wall portions of an intermediate piece that may be used in fabricating the cube of FIG. 13; and FIG. 15 is a fragmentary sectional view on an enlarged scale taken substantially as indicated along the line 15—15 of FIG. 13.

DETAILED DESCRIPTION OF THE INVENTION

Referring to the drawings in detail, and referring first to FIGS. 1 to 5, a multiplanar device such as a lamp shade consists of a polygonal top wall 20; two sides, such as the side indicated generally at 21, each of which consists of an upper inclined wall 22 and a lower upright wall 23; and two end assemblies, indicated generally at 24. Each of the end assemblies has inclined walls 25, 26 and 27, and vertically depending walls 28, 29 and 30.

All the walls are connected with one another by miter joints the construction of which is best seen in FIGS. 2 and 5. Each of the upper inclined walls 22 is connected to the top wall 20 by a miter joint 31, and to the lower upright wall 23 by a miter joint 32. The inclined walls 25, 26 and 27 of each of the end assemblies 24 are connected to the top wall 20 by respective miter joints 33, 34 and 35. Additional miter joints 36 connect the inclined walls 25 to the vertically depending walls 28, miter joints 37 connect the inclined walls 26 to the vertically depending walls 29, and additional miter joints, not illustrated in their finished form, connect the inclined walls 27 to the vertically depending walls 30. All the miter joints 31 through 37 are partially preformed, as illustrated in FIGS. 3 and 4.

In addition to the partially preformed miter joints 31 to 37, the finished assembly also includes miter joints such as the joint 38 illustrated in FIG. 6 which connects the lower upright side wall 23 with the vertically depending wall 29 which is a part of the end assembly 24. Miter joints such as the joint 38 are not partially preformed in the same sense as are the joints 31 through 37, because the walls connected by joints such as the joint 38 were originally separate as seen in FIG. 3, and are only joined in the final forming of the multiplanar device. Joints like the joint 38 include a joint 39 between the upper inclined side wall 22 and the inclined wall 26 of the end assembly, and further miter joints which connect all the adjacent inclined walls and all the adjacent upright and vertical walls to one another to complete a closed figure.

Referring now particularly to FIG. 3, an intermediate piece 100 is molded flat and includes polygonal wall members of substantially rigid molded plastic which have major areas of substantially uniform thickness that provide the several walls 20–30. A suitable material for the wall members is polystyrene. Bonded to an entire surface of the intermediate piece 100 is a thin plastic film 101 which must be sufficiently flexible to be capable of vacuum preforming and bending at the miter joints. A vinyl or polyester film about 0.0015 to 0.002" thick is satisfactory.

The intermediate piece 100 is formed in a mold cavity which is shaped to provide partially preformed miter joints, as indicated generally at 131 in FIG. 4; and preformed miters, as indicated at 128 in FIG. 7. Each of the partially preformed miter joints such as 131 includes a strip 120 along a side portion of the top wall 20 which is substantially thicker than the major area of said top wall, and an identical strip 122 along the adjacent side portion of the upper inclined wall 22. The thickened strips 120 and 122 have adjacent faces 120a and 122a which define a 45° V-notch 123. The thin, flexible plastic film 101 extends completely around the thickened strips 120 and 122 and serves as a hinge across the V-notch 123. It is to be understood that there are partially preformed miter joints like the preform 131 along all the junctions between the top wall 20 and the inclined walls 22, 25, 26 and 27, and along the junctions between said inclined walls and the respective upright, or vertically depending walls 23, 28, 29 and 30.

Referring now to FIG. 7, the miter 128 is seen to consist of a thickened strip along a marginal portion of the wall 28, with said thickened strip having an inclined surface 128a which may meet with a complementarily inclined surface of a thickened miter strip 129 along the adjacent marginal portion of the wall 29, so that said miters may form a miter joint as seen in FIG. 6. It is understood, of course, that all the walls 22–30 have thickened miter strips like the miter strips 128 and 129 along their end marginal portions, so that all the adjacent miters may be joined into miter joints like the miter joint 38.

In addition, as best seen in FIG. 2, each of the lower upright walls 23 and each of the vertically depending walls 28, 29 and 30 has a thickened lower marginal strip such as the strip 123 illustrated in FIG. 2. Such strips are purely decorative, and in a device such as that illustrated in FIG. 1 may be shaped and colored to provide the appearance of a leaded margin which cooperates with all the other thickened marginal strips to present the appearance of lead framing around glass panels. The walls may, of course, be of any color or variety of colors so as to simulate stained glass.

In a preferred method of fabricating an intermediate piece such as piece 100, the thin film 101 is first vacuum formed to provide it with recesses such as the recess indicated generally at 102 in FIG. 4, the recess indicated generally at 103 in FIG. 7, and the recess indicated generally at 104 in FIG. 2. All such recesses fit into grooves in a face of the mold cavity in which the intermediate piece 100 is formed, so the mold cavity face completely supports the thin film 101 including the recesses. The material for the wall members 20–30 is introduced into the mold cavity with the thin film 101 supported upon said face, so that the wall members of the intermediate piece are formed and simultaneously bonded to the thin film 101.

The intermediate piece 100 is removed from the mold and placed in a fixture in which all the walls 22–30 may be bent at the partially preformed miter joints such as the joint 131. A bonding adhesive is applied to all the sides such as the sides 120a and 122a of the V-notch 123, so that when bending along the V-notches is carried out, the adjacent faces are bonded to one another as illustrated in FIG. 5. At the same time, the complementary faces of the miters such as the miters 128 and 129 are also coated with adhesive so that when the walls are bent along the partially preformed miter joints the adjacent faces of the miters such as 128 and 129 are bonded to one another to form miter joints such as the miter joint illustrated in FIG. 6.

It is quite apparent that an intermediate piece 100 as illustrated in FIG. 3 is practical only for the fabrication of a rather small device of the type illustrated in FIG. 1.

A mold capable of producing a large intermediate piece such as the piece 100 would be prohibitively expensive. Accordingly, if a device the shape of that illustrated in FIG. 1 is to be made in a size large enough to be used, for example, as a billiard table lamp, separate intermediate pieces must be made for the sides like the sides 21A in FIG. 3, and for the ends such as the ends 24A in FIG. 3. For that kind of large device, a sheet metal plate may be substituted for the plastic top wall 20, and the intermediate side and end pieces may be bonded to the margins of the metal top plate.

FIG. 8 illustrates an intermediate piece 124A which is suitable for fabricating either end of a large lamp such as a billiard table lamp; and FIG. 9 illustrates a component produced from the intermediate piece fastened to the end of a metal top plate 20A. An intermediate piece 124A as illustrated in FIG. 8 has partially preformed miter joints between the wall members 25A and 28A, the wall members 26A and 29A, and the wall members 27A and 30A, and each such partially preformed miter joint is the same as that illustrated in FIG. 4. In addition, there are partially preformed miter joints 140 between the wall members 25A and 26A, and between the wall members 25A and 27A. Additionally, there are miters like the miter 128 illustrated in FIG. 7 along adjacent margins of the wall members 28A, 29A and 30A. Additionally, thickened miter strips 25B, 26B and 27B are formed along the top margins of the wall members 25A, 26A and 27A for bonding the fabricated piece part to the end margin of the metal top plate 20A as illustrated in FIG. 9.

Referring agin to FIG. 4, it is apparent that the bottom of the V-notch 123 must be at the flexible film 101, or so close to it that the molded plastic below the V-notch can crack cleanly when it is bent.

Turning now to FIGS. 10 to 12, a multiplanar article takes the form of a hexagonal body, indicated generally at 220, which may be used for any of a variety of purposes. Thus, for example, the body 220 may be provided with a fixed bottom to make a container like a wastebasket. It may be long enough to provide a decorative column between top and bottom structural members. It may be connected to a base and have a large planar top mounted upon it, so that it provides the pedestal for a table. It may be a horizontally extending decorative element extending between two upright panels.

The body 220 has walls 221, 222, 223, 224, 225 and 226, and the entire outer surface of the article is enclosed in a thin, flexible film 201 which is bonded to the bodies of the walls.

As seen in FIG. 11, an intermediate piece, indicated generally at 200, for the body 220 has one or more partially preformed miter joints, indicated generally at 231; and said partially preformed miter joint comprises a thickened strip 241 extending along a marginal portion of the wall 221, a thickened strip 242 extending along a marginal portion of the wall 222, and faces 241a and 242a of said strip define a V-notch 243 having an angle of 60° between its sides.

The number of partially preformed miter joints in an intermediate piece 200 for a hexagonal body 220 depends upon the widths of the walls 221-226. If the walls are narrow enough to economically form all six of them in a single mold, then there will be five partially preformed miter joints and one miter joint, indicated generally at 238 in FIG. 10, which joins the wall 226 to the wall 221 by abutting a miter strip 248 on the wall 226 with a miter strip 249 on the wall 221 and bonding them with adhesive.

If the walls of the hexagonal body are too wide to make a single mold for all six walls practical, then an intermediate piece may consist of either two walls or three walls, again depending upon the practicalities of mold making. Thus, there might be one intermediate piece for the walls 221, 222 and 223, and a second intermediate piece for the walls 224, 225 and 226. In that case, of course, there would be two partially preformed miter joints in each intermediate piece, and the two intermediate pieces would be joined along their adjacent walls by miter joints like the joint 238 in FIG. 10.

If the walls are wide enough, it may be necessary to have three intermediate pieces, each consisting only of two walls.

In any case, the intermediate piece or intermediate pieces are placed in a fixture and bent at the V-notches 243 to bring adhesive coated faces 241a and 242a into abutment as seen in FIG. 12. At the same time, any miter joint such as the joint 238, to join two independently formed intermediate pieces, is made as previously described with respect to the first embodiment.

Referring now to FIGS. 13 to 15, a cube, indicated generally at 230, has six identical walls such as the walls 321, 322 and 323. As seen in FIG. 14, at least the two walls 321 and 322 are fabricated from a flat intermediate piece 300 having a continuous flexible film 301 covering its lower surface, which becomes the outer surface of the cube. Thickened miter strips 341 and 342 along the adjacent martinal portions of the respective wall members 321 and 322 have respective faces 341a and 342a which are at right angles to one another and define a notch 343 to provide a partially preformed miter joint 331.

The two wall members 321 and 322 are brought to the position illustrated in FIG. 15, closing the notch 343 and adhering the surfaces 341a and 342a to one another by means of adhesive.

There are, of course, several ways to fabricate a cube from intermediate pieces. There may be one intermediate piece to form the walls 321 and 322, a second intermediate piece to form the wall 323 and the wall opposite the wall 322, and a third intermediate piece to form the wall opposite the wall 321 and to form the bottom wall. Alternatively, a single intermediate piece may provide the walls 321, 322 and 323, and a second intermediate piece may provide the other three walls. It is even possible to provide a single intermediate piece which forms all but one wall, and close the open side of the cube with a separate wall member. In any event, any marginal portion of a wall member which is not part of a partially preformed miter joint has a thickened miter strip like the strip 341 or 342, and having an inclined surface like the surface 341a or 342a, so that two such miter strips may be joined as previously described with reference to FIGS. 6 and 7 of the first embodiment of the invention.

Whether the thickened miter strips are formed on the outer surfaces of the wall members as in the structure of FIGS. 1 to 9, or on the inner sides of the wall members as in the structures of FIGS. 10 to 15, depends entirely upon the desired appearance of the finished article.

An advantageous feature of the present invention is that any decorative material may be printed upon the thin flexible film 101, 201 or 301 when the film is flat, making it possible to do such printing by conventional methods. If the thin outer film must be vacuum preformed, as is the film 101, areas that are to be distorted to form recesses such as the recesses 102, 103 and 104 are printed with the distortion precalculated so that the distorted areas present the desired final appearance, as is well known in the art.

The foregoing detailed description has been given for clearness of understanding only and no unnecessary limitations should be understood therefrom as modifications will be obvious to those skilled in the art.

I claim:

1. A component for a multiplanar device having effectively planar, angularly related, rigid molded plastic walls, said component comprising:

first and second effectively planar polygonal wall members of substantially rigid molded plastic which have major areas of substantially uniform thickness, said wall members having strips along their adjacent side portions which are substantially thicker than said major areas and the adjacent sides of said wall members forming a miter joint which positions said wall members at a predetermined angle to one another, said adjacent sides being bonded together;

and a thin film of flexible plastic bonded to substantially the entirely of said wall members and forming a connection between said wall members around the outside of the miter joint.

2. The component of claim 1 in which each of said first and second wall members has a strip along each side portion which is substantially thicker than said major areas, and each side is a miter constructed and arranged to permit a plurality of components, all having thickened strips along each side and with the sides being miters, to be bonded to one another along said miters to form said multiplanar device.

3. The component of claim 1 or claim 2 in which each thicker strip is defined by an inwardly projecting rib.

4. The component of claim 1 or claim 2 in which each thicker strip is defined by an outwardly projecting rib.

* * * * *